(12) United States Patent
Brown (10) Patent No.: US 6,571,141 B1
(45) Date of Patent: May 27, 2003

(54) APPLICATION PROGRAMS FOR MOTION CONTROL DEVICES INCLUDING ACCESS LIMITATIONS

(75) Inventor: David W. Brown, Bingen, WA (US)

(73) Assignee: Roy-G-Biv Corporation, Bingen, WA (US)

( * ) Notice: Subject to any disclaimer, the term of this patent is extended or adjusted under 35 U.S.C. 154(b) by 0 days.

(21) Appl. No.: 09/565,627

(22) Filed: May 4, 2000

Related U.S. Application Data (63) Continuation-in-part of application No. 09/205,627, filed on Dec. 3, 1998, now Pat. No. 6,209,037, which is a continuation-in-part of application No. 09/191,981, filed on Nov. 13, 1998, now abandoned, which is a continuation of application No. 08/656,421, filed on May 30, 1996, now Pat. No. 5,867,385, which is a continuation-in-part of application No. 08/454,736, filed on May 30, 1995, now Pat. No. 5,691,897.

(60) Provisional application No. 60/132,695, filed on May 4, 1999.

(51) Int. Cl.⁷ .......................... G05B 19/42; G06F 11/30

(52) U.S. Cl. ......................................... 700/86; 713/200

(58) Field of Search .............................. 700/56, 86, 87; 705/64; 713/166, 200, 201, 202

(56) References Cited

U.S. PATENT DOCUMENTS

| | | |
|---|---|---|
| 4,159,417 A | 6/1979 | Rubincam |
| 4,418,381 A | 11/1983 | Molusis et al. |
| 4,531,182 A | 7/1985 | Hyatt |
| 4,713,808 A | 12/1987 | Gaskill |
| 4,767,334 A | 8/1988 | Thorne et al. |
| 4,809,335 A | 2/1989 | Rumsy |
| 4,840,602 A | 6/1989 | Rose |
| 4,846,693 A | 7/1989 | Baer |
| 4,855,725 A | 8/1989 | Fernandez |
| 4,857,030 A | 8/1989 | Rose |
| 4,887,966 A | 12/1989 | Gellerman |
| 4,897,835 A | 1/1990 | Gaskill |
| 4,937,737 A | 6/1990 | Schwane et al. |
| 5,095,445 A | 3/1992 | Sekiguchi |
| 5,120,065 A | 6/1992 | Driscoll et al. |
| 5,126,932 A | 6/1992 | Wolfson et al. |

(List continued on next page.)

FOREIGN PATENT DOCUMENTS

| | | |
|---|---|---|
| EP | 0442676 A2 | 8/1991 |
| EP | 0 281 427 B1 | 8/1992 |
| EP | 0508912 A1 | 10/1992 |

(List continued on next page.)

OTHER PUBLICATIONS

WOSA Backgrounder: Delivering Enterprise Services to the Windows–based Desktop, Jul. 1993, Microsoft Development Library; pp. 1–19.

WOSA Inside Windows 95; pp. 348–351 (Date unknown).

Software Products for Industrial Automation, ICONICS; 6 pages (Date unknown).

(List continued on next page.)

Primary Examiner—Paul P. Gordon
(74) Attorney, Agent, or Firm—Michael R. Schacht (57) ABSTRACT

A security system for controlling access to motion control systems. The security system limits access to application programming interface (API) functions. The limitations on API functions can be implemented as a denial of access to certain restricted functions and/or as a limitation on certain controlled parameters employed by certain restricted functions. The security system may allow or disallow access based on users or accounts. The security system may also be programmed to prevent access to certain functions arbitrarily as determined by a system administrator or on criteria such as the status of the system.

25 Claims, 10 Drawing Sheets

U.S. PATENT DOCUMENTS

| | | | |
|---|---|---|---|
| 5,168,441 | A | 12/1992 | Onarheim et al. |
| 5,175,817 | A | 12/1992 | Adams et al. |
| 5,245,703 | A | 9/1993 | Hubert |
| 5,247,650 | A | 9/1993 | Judd et al. |
| 5,377,258 | A | 12/1994 | Bro |
| 5,390,330 | A | 2/1995 | Talati |
| 5,392,207 | A | 2/1995 | Wilson et al. |
| 5,402,518 | A | 3/1995 | Lowery |
| 5,412,757 | A | 5/1995 | Endo |
| 5,450,079 | A | 9/1995 | Dunaway |
| 5,453,933 | A | 9/1995 | Wright et al. |
| 5,465,215 | A | 11/1995 | Strickland et al. |
| 5,491,813 | A | 2/1996 | Bondy et al. |
| 5,493,281 | A | 2/1996 | Owens |
| 5,596,994 | A | 1/1997 | Bro |
| 5,600,373 | A | 2/1997 | Chui et al. |
| 5,604,843 | A | 2/1997 | Shaw et al. |
| 5,607,336 | A | 3/1997 | Lebensfeld et al. |
| 5,608,894 | A | 3/1997 | Kawakami et al. |
| 5,617,528 | A | 4/1997 | Stechmann et al. |
| 5,636,994 | A | 6/1997 | Tong |
| 5,652,866 | A | 7/1997 | Aldred et al. |
| 5,655,945 | A | 8/1997 | Jani |
| 5,666,161 | A | 9/1997 | Kohiyama et al. |
| 5,670,992 | A | 9/1997 | Yasuhara et al. |
| 5,691,897 | A | 11/1997 | Brown et al. |
| 5,707,289 | A | 1/1998 | Watanabe et al. |
| 5,733,131 | A | 3/1998 | Park |
| 5,737,523 | A | 4/1998 | Callaghan et al. |
| 5,746,602 | A | 5/1998 | Kikinis |
| 5,752,880 | A | 5/1998 | Gabai et al. |
| 5,764,155 | A | 6/1998 | Kertesz et al. |
| 5,790,178 | A | 8/1998 | Shibata et al. |
| 5,800,268 | A | 9/1998 | Molnick |
| 5,801,946 | A | 9/1998 | Nissen et al. |
| 5,818,537 | A | 10/1998 | Enokida et al. |
| 5,821,987 | A | 10/1998 | Larson |
| 5,822,207 | A | 10/1998 | Hazama et al. |
| 5,828,575 | A | 10/1998 | Sakai |
| 5,846,132 | A | 12/1998 | Junkin |
| 5,852,441 | A | 12/1998 | Nakajima et al. |
| 5,855,483 | A | 1/1999 | Collins et al. |
| 5,867,385 | A | 2/1999 | Brown et al. |
| 5,873,765 | A | 2/1999 | Rifkin et al. |
| 5,890,963 | A | 4/1999 | Yen |
| 5,907,704 | A | 5/1999 | Gudmundson et al. |
| 5,907,831 | A | 5/1999 | Lotvin et al. |
| 5,914,876 | A | 6/1999 | Hirai |
| 5,920,476 | A | 7/1999 | Hennessey et al. |
| 5,924,013 | A | 7/1999 | Guido et al. |
| 5,960,085 | A | 9/1999 | De La Huerga |
| 5,977,951 | A | 11/1999 | Danieli et al. |
| 6,078,968 | A | 6/2000 | Lo et al. |
| 6,101,425 | A | 8/2000 | Govindaraj et al. |
| 6,139,177 | A | 10/2000 | Venkatraman et al. |
| 6,144,895 | A | 11/2000 | Govindaraj et al. |
| 6,216,173 | B1 | 4/2001 | Jones et al. |

FOREIGN PATENT DOCUMENTS

| | | |
|---|---|---|
| EP | 0 583 908 A2 | 2/1994 |
| EP | 0275826 A1 | 7/1998 |
| GB | 2 224 896 A | 12/1991 |
| JP | 59 228473 | 6/1983 |
| WO | WO 92/11731 | 7/1992 |
| WO | WO 93/08654 | 4/1993 |

OTHER PUBLICATIONS

WEB 3.0 Product Brochure, Trihedral Engineering Ltd. (1994); 6 pages.

The Complete, Computer–Based Automation Tool (IGSS) Seven Technologies A/S; 6 pages (date unknown).

Oregon Micro Systems Product Guide; pp. 1–20 (date unknown).

AIMAX–WIN Product Brochure, TA Engineering Co., Inc.; 8 pages (date unknown).

XANALOG Model NL–SIM Product Brochure, XANA-LOG, 4 pages (date unknown).

ExperTune PID Tuning Software, Gerry Engineering Software; 6 pages (date unknown).

PMAC Product Catalog, p. 43 (date unknown).

Paragon TNT Product Brochure, Intec Controls Corp.; 6 pages (date unknown).

Aerotech Motion Control Product Guide; pp. 233–234 (date unknown).

OpenBatch Product Brief, PID, Inc.; 6 pages (date unknown).

PC/DSP–Series Motion Controller C Programming Guide; pp. 1–54 (date unknown).

FIX Product Brochure, Intellution (1994); 6 pages (date unknown).

Precision Motion Controls Product Guide; p. 17 (date unknown).

Compumotor Digiplan (1993–94) Catalog pp. 10–11 (date unknown).

Sue Chen, Jonathon Lin; "Computer Numerical Control: Essentials in Programming and Networking"; Part 5, Chapter 27; pp. 824–848 (date unknown).

Pritschow et al.; "Open System Controllers: Challenge for the Future of the Machine Tool Industry"; pub. Jan. 15, 1993; pp. 449–452.

William E. Ford; "What Is an Open Architecture Robot Controller" pub. Aug. 16, 1994; pp. 27–32.

Marcos et al.; "A New Solution for Integrating Control Devices Involved in Computer–Integrated Manufacturing"; pub. Sep. 2, 1996; pp. 485–490.

Chu and Wang; "Development of a Practical SFC System for CNC Machine Shop"; pub. 1994; pp. 362–367.

Microsoft; "The Microsoft Object Technology Strategy"; pub. Mar. 1994; pp. 1–33.

Microsoft; "Open Systems: Technology, Leadership, and Collaboration"; pub. Mar. 1994; pp. 1–15.

Microsoft; Microsoft OLE Today and Tomorrow: Technology Overview; pub. Dec. 1993; pp. 1–9.

Microsoft; "Object Linking and Embedding 2.0 Backgrounder"; pub. Sep. 1993; pp. 1–15.

Robert Anderson; "SMART: A Modular Architecture for Robotics and Teleoperation"; pub. 1993; pp. 416–421.

Proctor et al.; "Validation of Standard Interfaces from a Machine Control"; pub. 1996; pp. 659–664.

Altintas et al.; "Design and Analysis of a Modular CNC System"; pub. Mar. 4, 1990; pp. 305–316.

Wright et al.; "Open Architecture Manufacturing: The Impact of Open–System Computers on Self–sustaining Machinery and the Machine Tool Industry"; pp. 41–47 (date unknown).

Protoctor et al.; "Open Architecture Controllers"; pub. Jun. 1997; pp. 60–64.

Lutz et al.; "OSACA—The Vendor–Neutral Control Architecture"; pub. Dec. 1997; pp. 247–256.

Morales et al.; "A Generalised Software Control System for Industrial Robots"; pub. 1998; pp. 411–416.

Feng et al.; "Distributed Control of a Multiple–Tethered Mobile Robot System for Highway Maintenance and Construction"; pub Nov. 1997; pp. 383–392.

Fedrowitz; IRL–Based Expansion of the Commonly Used High–Level Language C for Robot Programming: pub. Oct. 1995; 5 pages.

Szabo et al.; "Validation Results of Specifications for Motion Control Interoperability"; pub. 1997; pp. 166–167.

Chang et al.; "Development and Implementation of an Application Programming Interface for PC/DSP–based Motion Control System"; pub. 1998; pp. 94–105.

Mizukawa et al.; "OriN: Open Robot Interface for the Network: A Proposed Standard"; pub. May 2000; pp. 344–350.

Michaloski et al.; "A Framework for Component–base CNC Machines" pub. Nov. 1998; pp. 132–143.

Bouzouia et al.; "A Three–layer Workcell Control Architecture Design"; pub. May 1998; pp. 1185–1191.

Morales et al.; "GENERIS: The EC–JRC Generalized Software Development"; pub. Nov. 1998; pp. 251–265.

Muir et al.; "Mechatronic Objects for Real–time Control Software Development"; pub. Nov. 1998; pp. 251–265.

Cho et al.; "A Compact/Open Network–based Controller Incorporating Modular Software Architecture for a Humanoid Robot"; pub. 1999; pp. 341–355.

McGraw et al.; "A Friendly Command, Control, and Information System for Astronomy"; pub. 1996; pp. 356–367.

Jackman; "Robotic Control Using Sequential Function Charts"; pub. 1996; pp. 120–128.

Mizukawa et al.; "De–facto Standard API for Open and Networked Industrial Robots"; pub. Oct. 1999; pp. 455–462.

Leu et al.; "A Telemanufacturing Workcell over the Internet"; pub. Nov. 1998; pp. 230–237.

Natale et al.; "Robust Hybrid Force/Position Control with Experiments on an Industrial Robot"; pub. Sep. 19, 1999; pp. 956–961.

Nilsson et al.; "Integrated Architecture for Industrial Robot Programming and Control"; pub. Dec. 31, 1999; pp. 205–226.

Valera et al.; "Interactive Online Evaluation of Robot Motion Control"; pub. Aug. 22, 1999; pp. 1039–1043.

"NEMI Low–cost Controller Project"; pub. Dec. 1996; total pages 392.

Sperling; "Designing Applications for an OSACA Control"; pub. Nov. 16, 1997; 5 pages.

Lutz et al.; "OSACA: The Vendor–neutral Control Architecture"; pub. 1997; 10 pages.

Sperling et al.; "Enabling Open Control Systems: An Introduction to the OSACA System Platform"; pub. May 1996; pp. 1–8.

"Requirements of Open Modular Architecture Controllers for Applications in the Automotive Industry"; pub. Dec. 13, 1994; pp. 1–13.

Open, Modular Architecture Controls at GM Powertrain; pub. May 14, 1996; pp. 1–33.

"Technologies Enabling Agile Manufacturing (TEAM) Intelligent Closed Loop Processing"; pub. Jan. 11, 1996; 30 pages.

FIG. 3b  Module Interaction Map

FIG. 4  Security Logic

APPLICATION PROGRAMS FOR MOTION CONTROL DEVICES INCLUDING ACCESS LIMITATIONS

RELATED APPLICATIONS

This application claims priority of U.S. Provisional Patent Application Ser. No. 60/132,693, which was filed on May 4, 1999.

This application is a Continuation-In-Part of 09/205,627 now U.S. Pat. No. 6,209,037 issued Mar. 27, 2001, which is a Continuation-In-Part of Ser. No. 09/191,981 filed Nov. 13, 1998, now abandoned, which is a Continuation of Ser. No. 08/656,421 filed May 30, 1996, now U.S. Pat. No. 5,867,385, which is a Continuation-In-Part of Ser. No. 08/454,736 filed May 30, 1995, now U.S. Pat. No. 5,691,897.

TECHNICAL FIELD

The present invention relates to motion control systems and, more particularly, to interface software that facilitates the creation of hardware independent motion control software that incorporates parameter and/or function access limitations.

BACKGROUND OF THE INVENTION

The purpose of a motion control device is to move an object in a desired manner. The basic components of a motion control device are a controller and a mechanical system. The mechanical system translates signals generated by the controller into movement of an object.

While the mechanical system commonly comprises a drive and an electrical motor, a number of other systems, such as hydraulic or vibrational systems, can be used to cause movement of an object based on a control signal. Additionally, it is possible for a motion control device to comprise a plurality of drives and motors to allow multi-axis control of the movement of the object.

The present invention is of particular importance in the context of a mechanical system including at least one drive and electrical motor having a rotating shaft connected in some way to the object to be moved, and that application will be described in detail herein. But the principles of the present invention are generally applicable to any mechanical system that generates movement based on a control signal. The scope of the present invention should thus be determined based on the claims appended hereto and not the following detailed description.

In a mechanical system comprising a controller, a drive, and an electrical motor, the motor is physically connected to the object to be moved such that rotation of the motor shaft is translated into movement of the object. The drive is an electronic power amplifier adapted to provide power to a motor to rotate the motor shaft in a controlled manner. Based on control commands, the controller controls the drive in a predictable manner such that the object is moved in the desired manner.

These basic components are normally placed into a larger system to accomplish a specific task. For example, one controller may operate in conjunction with several drives and motors in a multi-axis system for moving a tool along a predetermined path relative to a workpiece.

Additionally, the basic components described above are often used in conjunction with a host computer or programmable logic controller (PLC). The host computer or PLC allows the use of a high-level programming language to generate control commands that are passed to the controller. Software running on the host computer is thus designed to simplify the task of programming the controller.

Companies that manufacture motion control devices are, traditionally, hardware oriented companies that manufacture software dedicated to the hardware that they manufacture. These software products may be referred to as low level programs. Low level programs usually work directly with the motion control command language specific to a given motion control device. While such low level programs offer the programmer substantially complete control over the hardware, these programs are highly hardware dependent.

In contrast to low-level programs, high-level software programs, referred to sometimes as factory automation applications, allow a factory system designer to develop application programs that combine large numbers of input/output (I/O) devices, including motion control devices, into a complex system used to automate a factory floor environment. These factory automation applications allow any number of I/O devices to be used in a given system, as long as these devices are supported by the high-level program. Custom applications, developed by other software developers, cannot be developed to take advantage of the simple motion control functionality offered by the factory automation program.

Additionally, these programs do not allow the programmer a great degree of control over the each motion control device in the system. Each program developed with a factory automation application must run within the context of that application.

In this overall context, a number of different individuals are involved with creating a motion control system dedicated to performing a particular task. Usually, these individuals have specialized backgrounds that enable them to perform a specific task in the overall process of creating a motion control system. The need thus exists for systems and methods that facilitate collaboration between individuals of disparate, complimentary backgrounds who are cooperating on the development of motion control systems.

PRIOR ART

A number of software programs currently exist for programming individual motion control devices or for aiding in the development of systems containing a number of motion control devices.

The following is a list of documents disclosing presently commercially available high-level software programs: (a) Software Products For Industrial Automation, iconics 1993; (b) The complete, computer-based automation tool (IGSS), Seven Technologies A/S; (c) OpenBatch Product Brief, PID, Inc.; (d) FIX Product Brochure, Intellution (1994); (e) Paragon TNT Product Brochure, Intec Controls Corp.; WEB 3.0 Product Brochure, Trihedral Engineering Ltd. (1994); and (g) AIMAX-WIN Product Brochure, TA Engineering Co., Inc. The following documents disclose simulation software: (a) ExperTune PID Tuning Software, Gerry Engineering Software; and (b) XANALOG Model NL-SIM Product Brochure, XANALOG.

The following list identifies documents related to low-level programs: (a) Compumotor Digiplan 1993–94 catalog, pages 10–11; (b) Aerotech Motion Control Product Guide, pages 233–34; (c) PMAC Product Catalog, page 43; (d) PC/DSP-Series Motion Controller C Programming Guide, pages 1–3; (e) Oregon Micro Systems Product Guide, page 17; (f) Precision Microcontrol Product Guide.

The Applicants are also aware of a software model referred to as WOSA that has been defined by Microsoft for use in the Windows programming environment. The WOSA model is discussed in the book Inside Windows 95, on pages 348–351. WOSA is also discussed in the paper entitled WOSA Backgrounder: Delivering Enterprise Services to the Windows-based Desktop. The WOSA model isolates application programmers from the complexities of programming to different service providers by providing an API layer that is independent of an underlying hardware or service and an SPI layer that is hardware independent but service dependent. The WOSA model has no relation to motion control devices.

The Applicants are also aware of the common programming practice in which drivers are provided for hardware such as printers or the like; an application program such as a word processor allows a user to select a driver associated with a given printer to allow the application program to print on that given printer.

While this approach does isolates the application programmer from the complexities of programming to each hardware configuration in existence, this approach does not provide the application programmer with the ability to control the hardware in base incremental steps. In the printer example, an application programmer will not be able to control each stepper motor in the printer using the provided printer driver; instead, the printer driver will control a number of stepper motors in the printer in a predetermined sequence as necessary to implement a group of high level commands.

The software driver model currently used for printers and the like is thus not applicable to the development of a sequence of control commands for motion control devices.

The Applicants are additionally aware of application programming interface security schemes that are used in general programming to limit access by high-level programmers to certain programming variables. For example, Microsoft Corporation's Win32 programming environment implements such a security scheme. To the Applicants' knowledge, however, no such security scheme has ever been employed in programming systems designed to generate software for use in motion control systems.

SUMMARY OF THE INVENTION

The present invention is a system for generating an application program for motion control systems including a security system for limiting access to predetermined functions or parameters of the motion control system.

DETAILED DESCRIPTION OF THE INVENTION

The present invention is a security system for use with systems and methods for generating application programs for controlling motion control systems such as are described in U.S. Pat. No. 5,867,385, issued Feb. 2, 1999, to Brown et al. The present invention is intended to be used with systems and methods for generating software for controlling motion control systems, including such systems and methods other than what is described in the '385 patent; the security system of the present invention may, however, be used with other systems and methods for generating software or operating motion control systems. The following description of the systems and methods described in the '385 patent is thus included for illustrative purposes only and is not intended to limit the scope of the present invention.

Referring now to the drawing, depicted therein at 10 in FIG. 1 is an exemplary motion control system as described in the '385 patent. The motion control system 10 comprises a personal computer portion 12 having a hardware bus 14, a plurality of motion control hardware controllers 16a, 16b, and 16c, and mechanical systems 18a, 18b, and 18c that interact with one or more objects (not shown) to be moved. The personal computer portion 12, hardware bus 14, hardware controllers 16, and mechanical systems 18 are all well-known in the art and will not be discussed herein beyond the extent necessary to provide a complete understanding of the present invention. The motion control hardware controllers 16 and their associated mechanical systems 18 form motion control devices 20 for moving objects.

The personal computer portion 12 contains a software system 22 that allows an application user 24 to create software applications 26 that control the motion control devices 20. More particularly, based on data input by the user 24 and the contents of the application program 26, the software system 22 generates control commands that are transmitted by one or more streams such as those indicated at 28a, 28b, 28c, and 28d. The streams 28 transmit control commands incorporating the hardware specific command language necessary to control a given motion control device 20 to perform in a desired manner. The streams 28 implement the communication protocol that allows the control commands to reach the appropriate motion control device 28 via an appropriate channel (i.e., PC bus, serial port).

As generally discussed above, the generation of software for controlling motion control devices normally (but not necessarily) involves the labors of at least two and perhaps three separate designers: a software system designer; a hardware designer familiar with the intricacies of the motion control device; and a motion control system designer.

The software system designer develops the software system 22 and will have generalized knowledge of motion control systems and devices but will not have detailed knowledge of specific motion control systems or devices. The application user 24 discussed above will normally be the motion control system designer.

The motion control system designer will understand and define the overall motion control system 10, but may not know the details of the individual motion control devices 20 employed by the system 10 or the software system 22 employed to generate the application program 26.

The hardware designer normally possesses very detailed knowledge of specific motion control hardware devices 20, but will normally not have knowledge of the system 10 in which the devices 20 are incorporated.

The present invention primarily relates to systems and methods for coordinating the knowledge of the motion control system designer and the hardware designer. In particular, the present invention is a system or method for allowing the hardware designer to customize or alter the software system 22 such that the motion control system designer can write application programs 26 that control the motion control hardware devices 20 such that these devices are operated within acceptable operating parameters.

As discussed in detail in the '385 patent, the software system designer initially defines a set of motion control operations that are used to perform motion control. The motion control operations are not specifically related to any particular motion control device hardware configuration, but are instead abstract operations that all motion control device hardware configurations must perform in order to function.

Motion control operations may either be primitive operations or non-primitive operations. Primitive operations are operations that are necessary for motion control and cannot be simulated using a combination of other motion control operations. Examples of primitive operations include GET POSITION and MOVE RELATIVE, which are necessary for motion control and cannot be emulated using other motion control operations. Non-primitive operations are motion control operations that do not meet the definition of a primitive operations. Examples of non-primitive operations include CONTOUR MOVE, which may be emulated using a combination of primitive motion control operations.

Given the set of motion control operations as defined above, the software system designer next defines a service provider interface (SPI) comprising a number of driver functions. Driver functions may be either core driver functions or extended driver functions. Core driver functions are associated with primitive operations, while extended driver functions are associated with non-primitive operations. As with motion control operations, driver functions are not related to a specific hardware configuration; basically, the driver functions define parameters necessary to implement motion control operations in a generic sense, but do not attach specific values or the like to these parameters.

The software system designer next defines an application programming interface (API) comprising a set of component functions. For these component functions, the software system designer writes component code that associates at least some of the component functions with at least some of the driver functions. The relationship between component functions and driver functions need not be one to one: for example, certain component functions are provided for administrative purposes and do not have a corresponding driver function. However, most component functions will have an associated driver function.

The overall software model implemented by the software program 22 thus contains an API comprising component functions and an SPI comprising driver functions, with the API being related to the SPI by component code associated with the component functions.

The motion control system designer (normally also the user 24) develops the application program 26. The application program 26 comprises a sequence of component functions arranged to define the motion control operations necessary to control a motion control device to move an object in a desired manner. The application program 26 is any application that uses the system 22 by programming the motion control component 35. As mentioned above, the component code associates many of the component functions with the driver functions, and the driver functions define the parameters necessary to carry out the motion control operations. Thus, with appropriately ordered component functions, the application program 26 contains the logic necessary to move the object in the desired manner.

The software system 22 thus generates control commands based on the component functions contained in the application program 26, the component code associated with the component functions, and the driver code associated with the selected software driver 28.

As the control commands are being generated as described above, they may be directly transmitted to a motion control device to control this device in real time or stored in an output file for later use. The software system 22 employs the streams 28 to handle the transmission of the control commands to a desired destination thereof. In the exemplary system 22, the destinations of the control commands may be one or more of an output file 34 and/or the controllers 16.

Referring again to FIG. 1, this Figure shows that the system 22 further comprises a motion control component 35 and a driver stub module 36. The motion control component module 35 is the portion of the software system 22 that relates the component functions to the driver functions. The motion control component module 35 thus contains the component code that makes the association between the component functions contained in the application program 26 and the driver functions.

Referring again for a moment to FIG. 1, this Figure illustrates that the system 22 additionally comprises a driver administrator CPL applet 38 and a DDE server 40. The driver administration CPL applet 38 generates the user interface through which the user 24 communicates with the driver administrator module 32. The DDE server 40 provides the software interface through which the application program 26 communicates with the motion control component module 35.

Figure 1A:
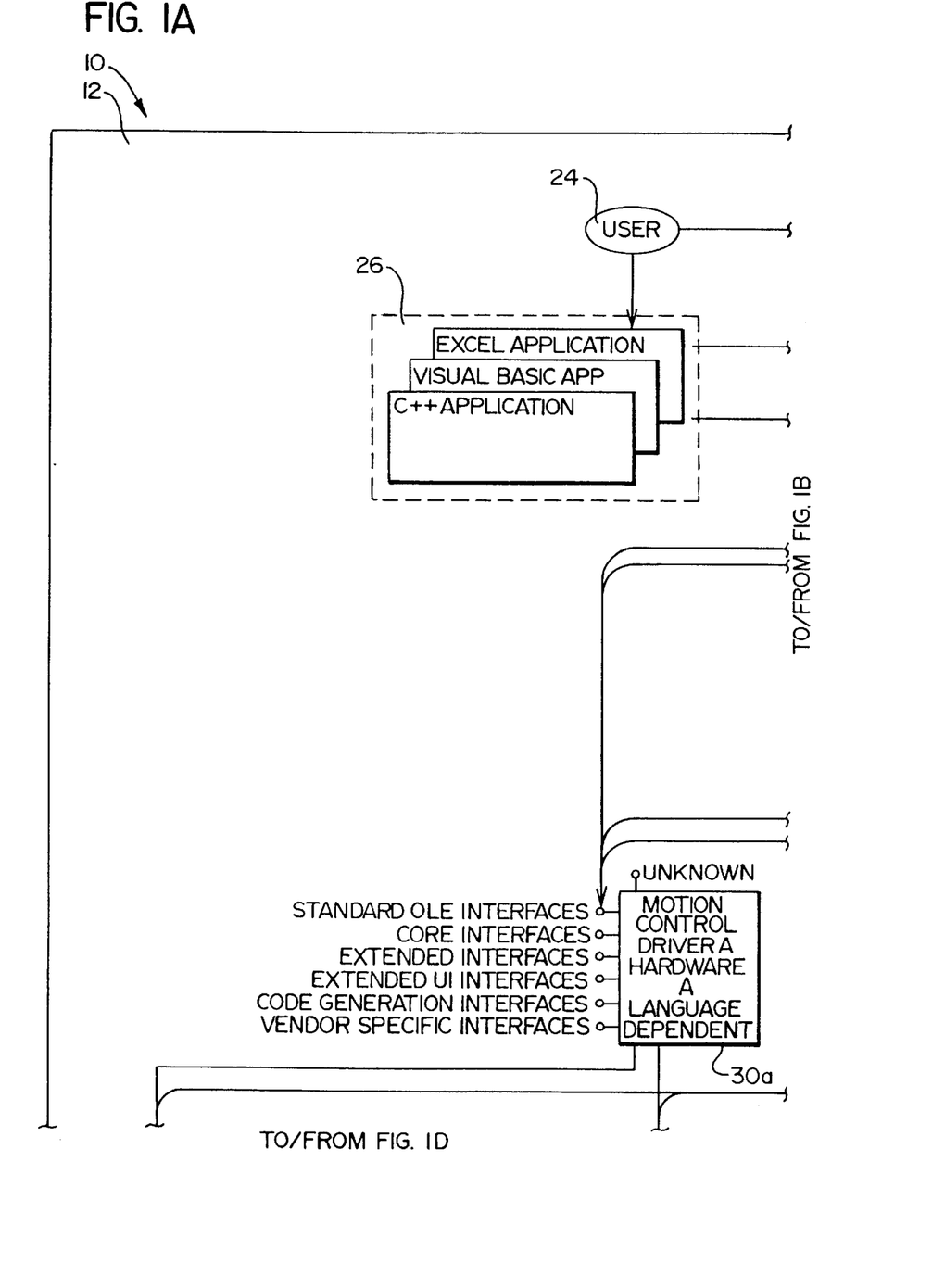
FIG. 1 is a system interaction map of an exemplary motion control system in connection with which a security system of the present invention may be used.
Figure 1B:
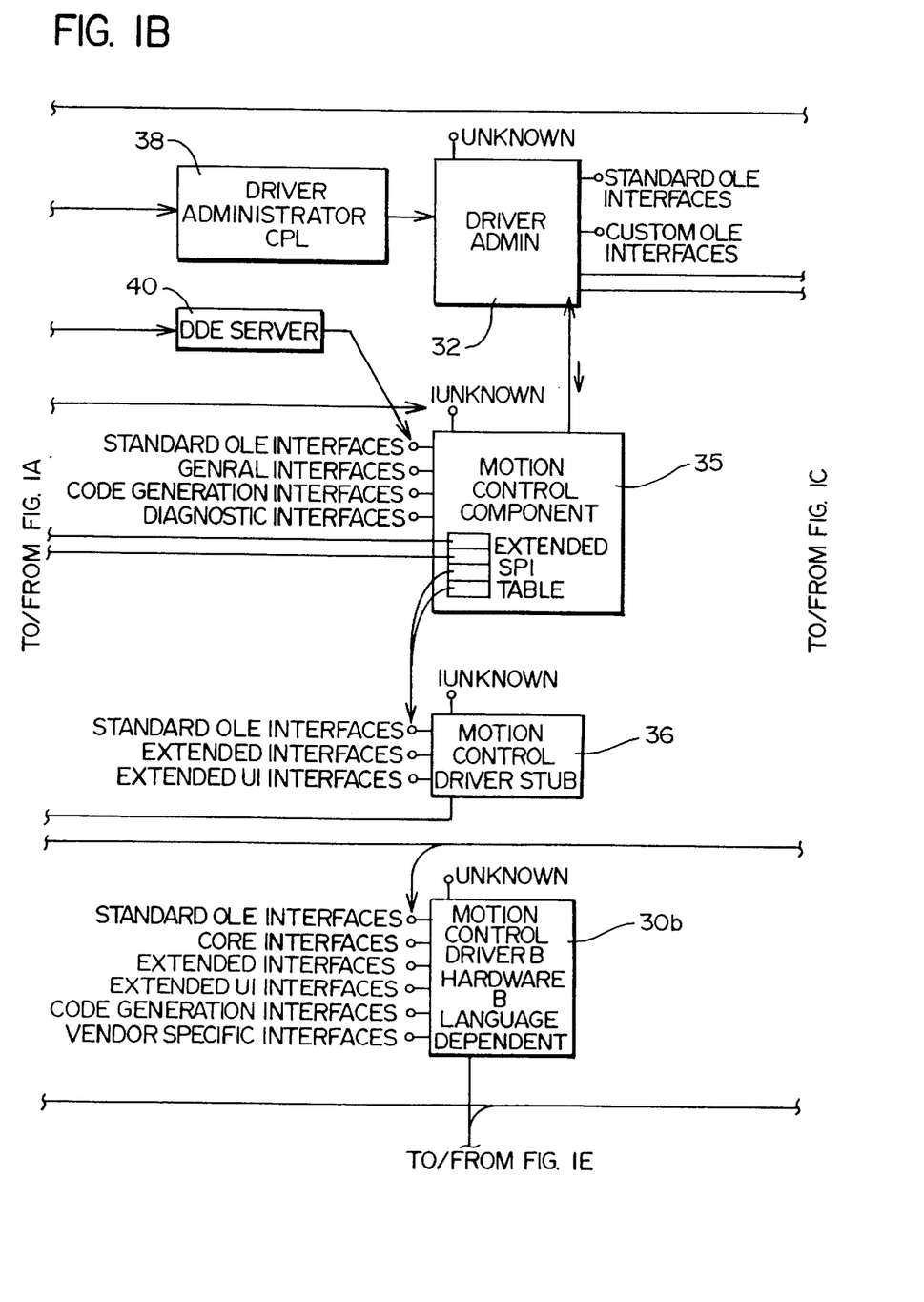
Figure 1C:
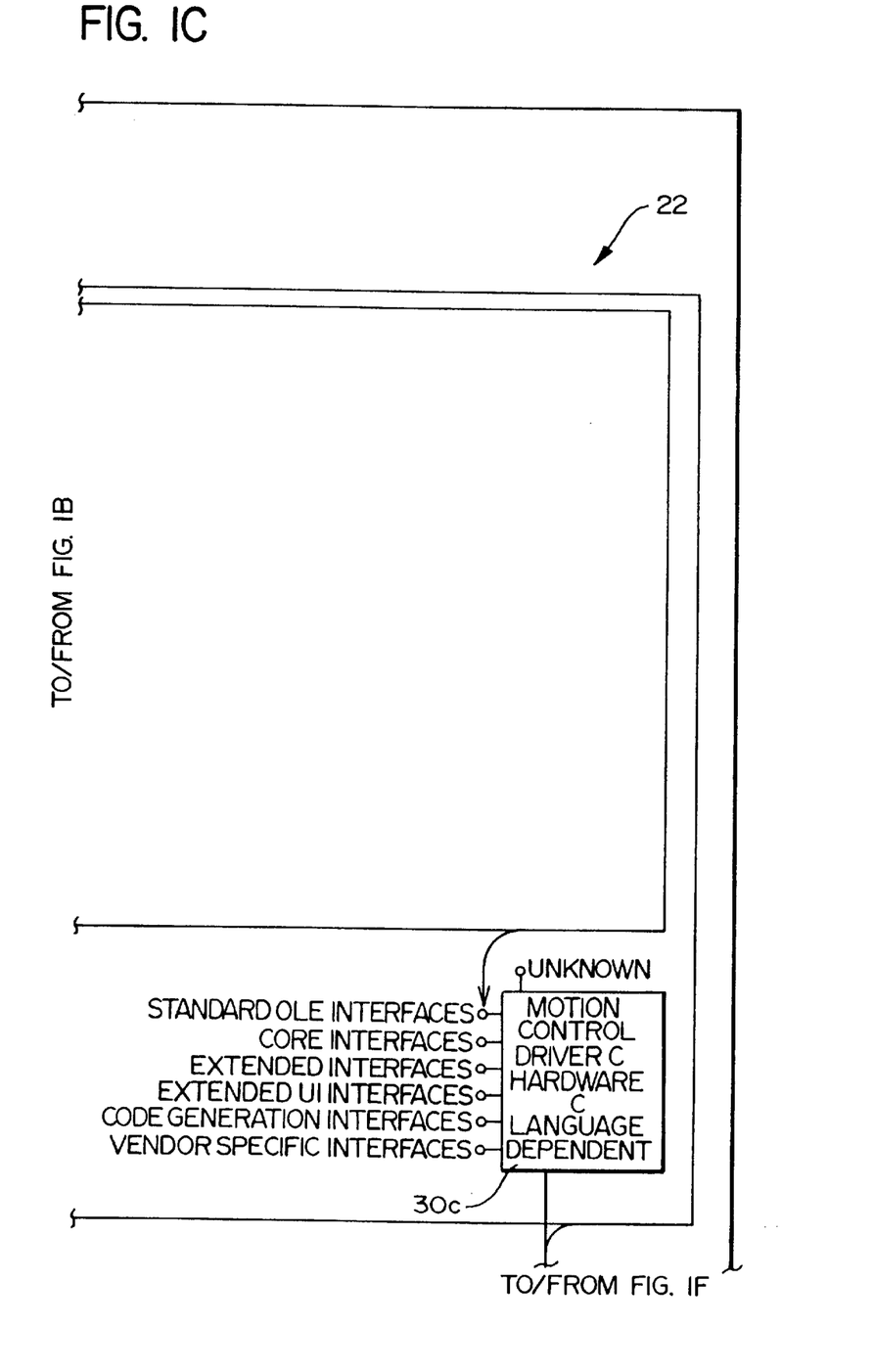
Figure 1D:
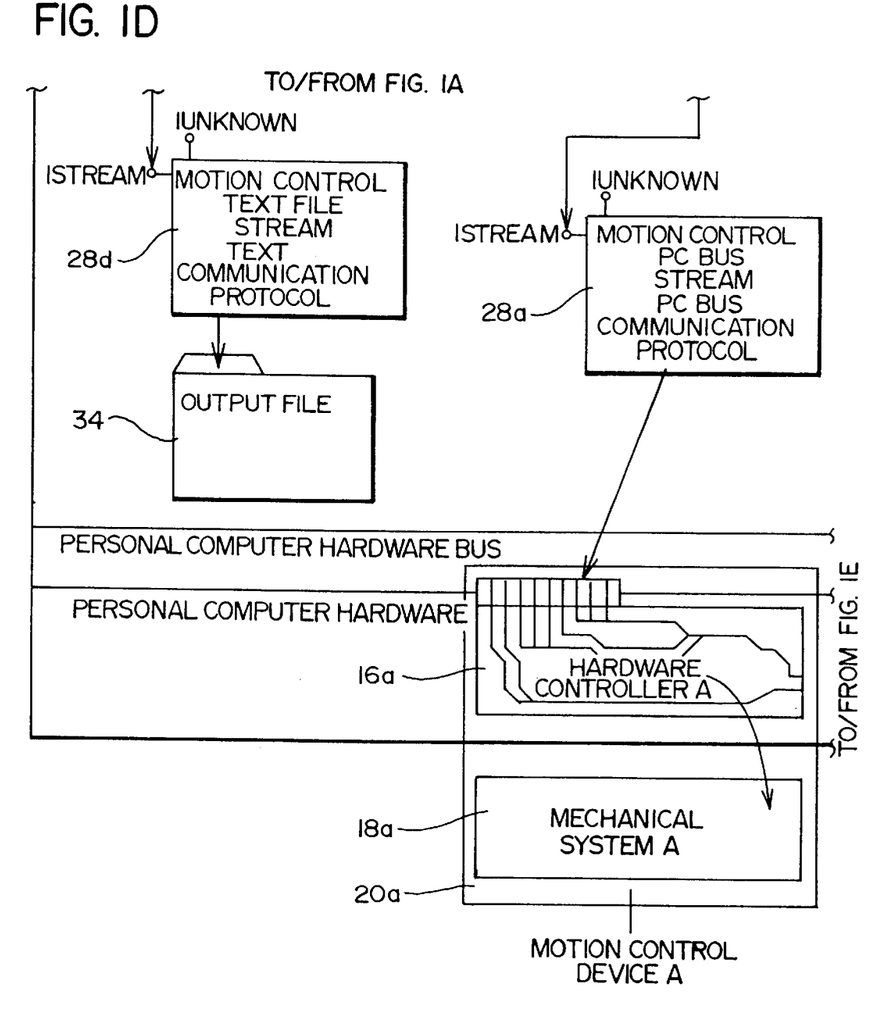
Figure 1E:
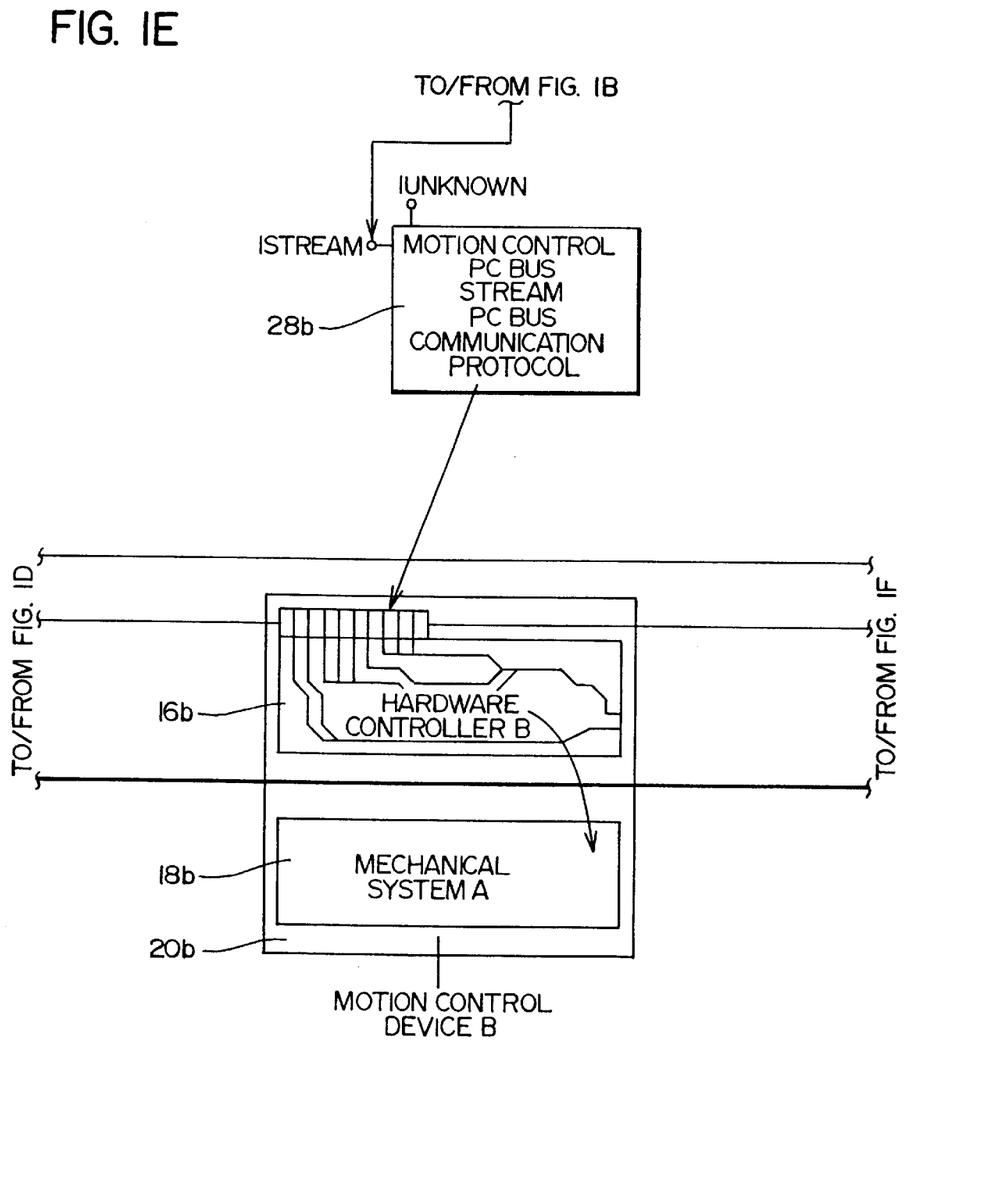
Figure 1F:
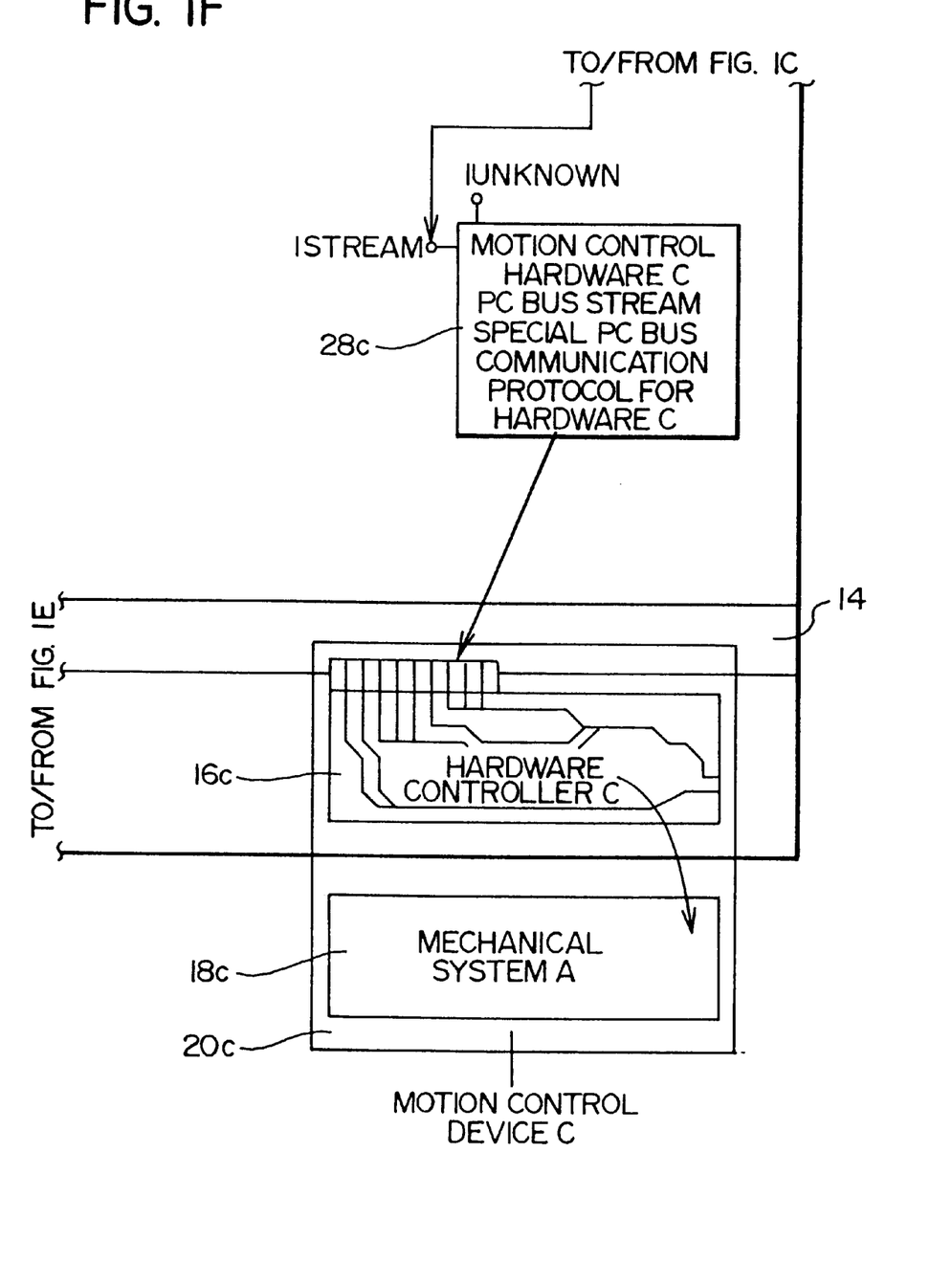
Figure 2:
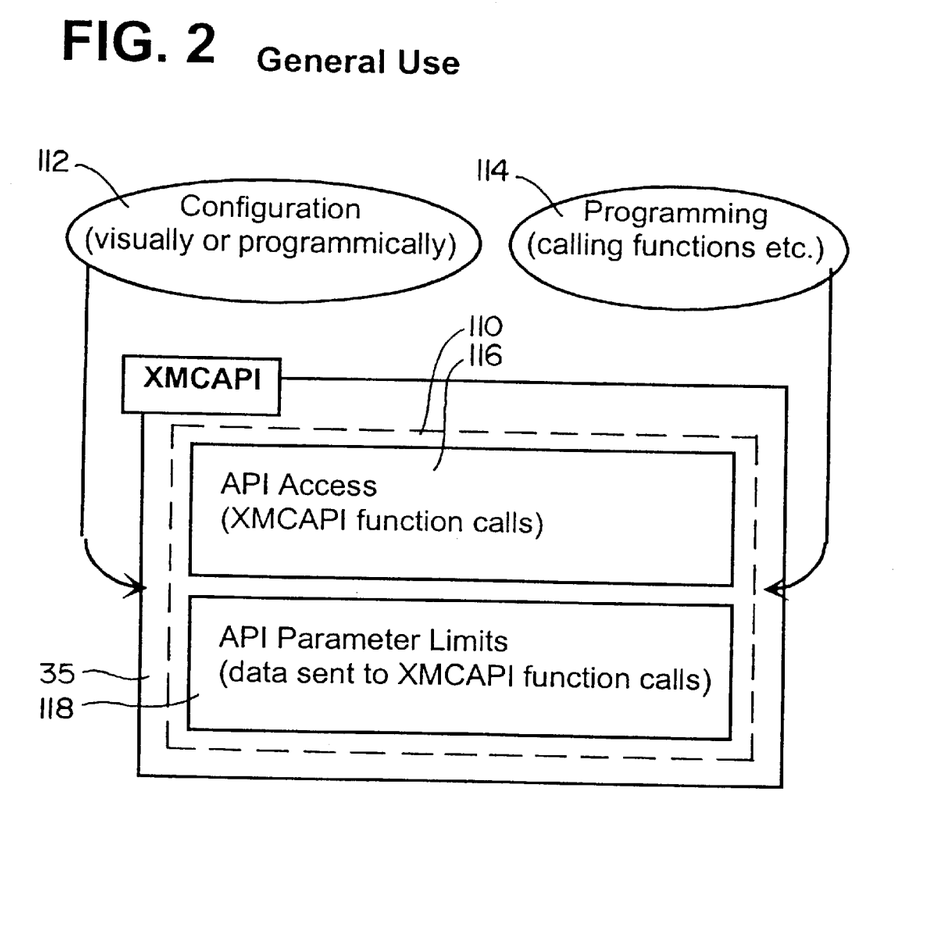
FIG. 2 is a block diagram depicting how a security system of the present invention could be integrated with the motion control system of FIG. 1.

With the foregoing general understanding of an exemplary motion control system in mind, the block diagram of FIG. 2 will now be discussed. Depicted in FIG. 2 is a security system 110 constructed in accordance with, and embodying, the principles of the present invention. The exemplary security system 110 is implemented as part of the motion control component 35 of the motion control system 10 described above; the security system 110 may, however, be implemented in other systems.

The security system 110 places limits on what the motion control system designer can do when developing the application program 26. As schematically shown at 112 in FIG. 2, the motion control component 35 may be programmed, either visually or programmatically, with limitations related to an external system to be controlled such as a motion control device or devices. In practice, a hardware designer will likely determine what limitations are appropriate, and a program administrator in charge of a specific implementation of the software system 22 will program the motion control component 35 with the limitations determined by the hardware designer. The hardware designer and program administrator may be is the same person, and the term "program administrator" will be used herein to refer to the person who configures the motion control component 35 with security settings as discussed above.

A primary purpose of the present invention is thus to allow the program administrator to control the operation of the software system 22 such that access to one or more API functions is restricted based on such factors as the identity of a particular user or account and the status of the motion control system 10. For example, a junior user may be given access to certain API functions but not others. Alternatively, the entire software system may be disabled based on the status of the motion control devices 20. The restrictions implemented by the security system 110 may be based on other factors as the program administrator deems necessary.

After the motion control component 35 has been configured by the program administrator, the motion control system designer interacts, as shown schematically at 114 in FIG. 2, with the component 35 to develop the application program 26. The limitations programmed into the component 35 by the configuration process 112 restrict the system designer's development of the application program 26.

Figure 3A:
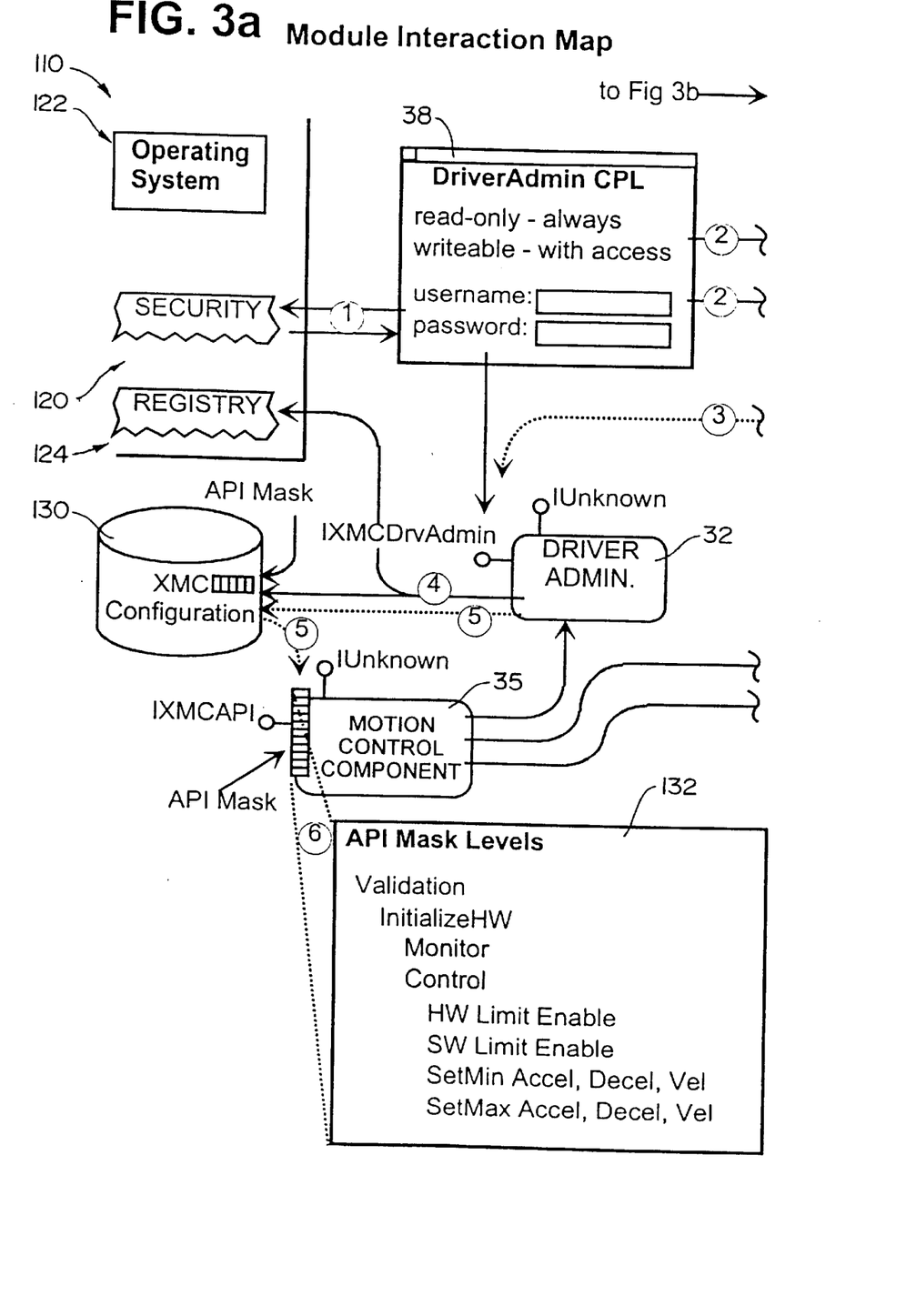
FIG. 3 is a module interaction map depicting how the modules of the motion control system interact when modified to include the security system of FIG. 2.
Figure 3B:
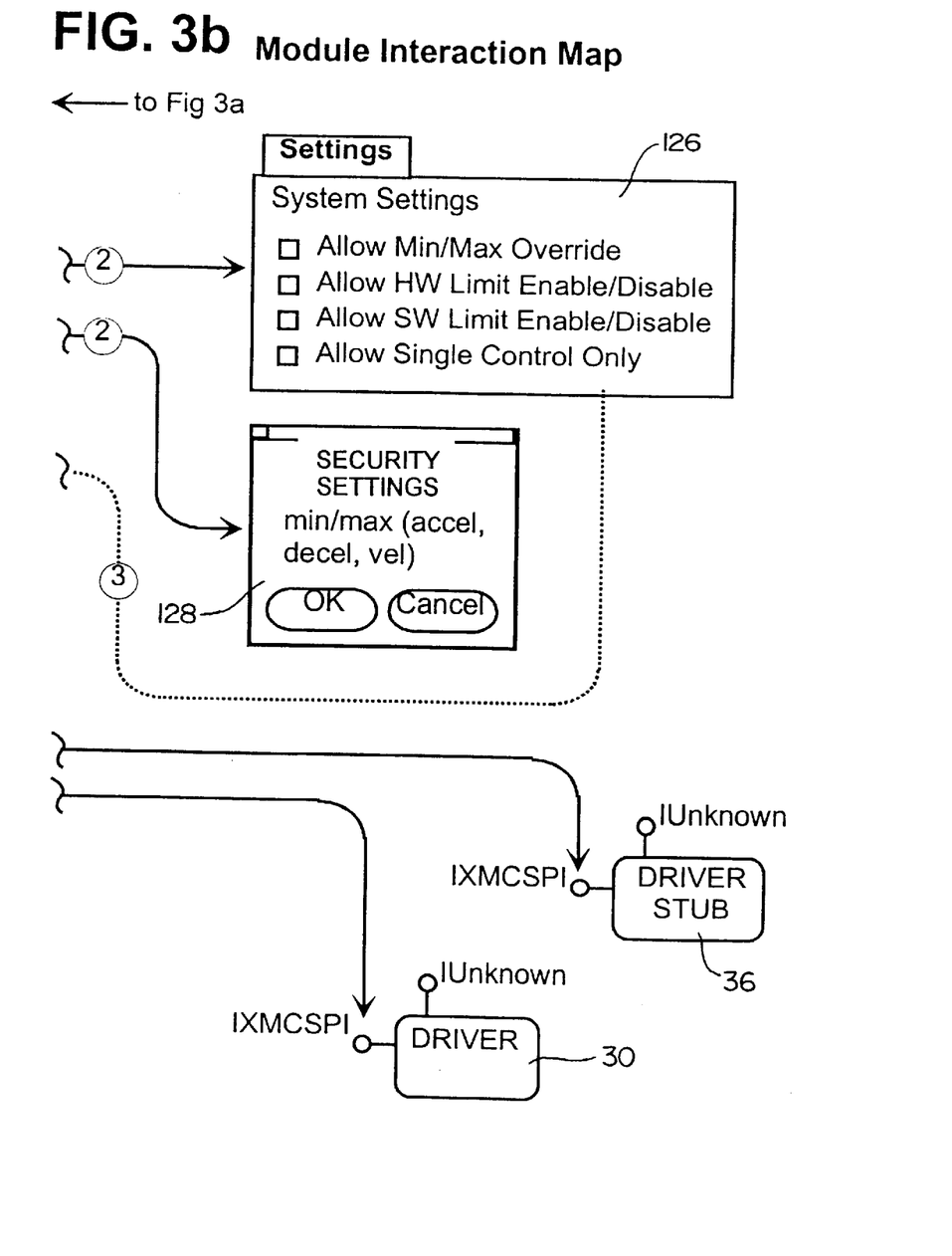

More specifically, as shown in FIG. 3 the exemplary security system 110 is a software program that comprises at least one of an API access block 116 and an API parameter limit block 118.

The API access block 116 limits the motion control system designer's ability to call predetermined functions of the API defined by the software system 22. The predetermined functions access to which is controlled by the security system 110 will be referred to as controlled functions. When the controlled functions are called while programming an application program 26, the software system 22 will indicate that access to these programs is restricted by, for example, generating an error code (e.g., ACCESSDENIED).

The API parameter block 118 limits the motion control system designer's ability to set predetermined parameters used by API functions outside certain limits or beyond certain thresholds. The predetermined parameters limited by the security system 110 will be referred to as controlled or restricted parameters; a function having controlled or restricted parameters will be referred to herein as a parameter-control function. The parameter limitations associated with the controlled parameters can be enforced by, for example, returning an error code as described above or simply by clipping the controlled parameter to the closest allowed value for that parameter whenever an attempt to use an inappropriate parameter value is made.

Any controlled function or parameter-control function will be referred to herein as a restricted function. The term "restricted" as used herein thus includes both prohibiting use of a function as in the case of the exemplary controlled function described above and allowing use of a function in a limited manner as in the case of one of the examples of the exemplary parameter-control function described above.

Either or both of the API access block 116 and API parameter limits block 118 may be used in a given security system constructed in accordance with the principles of the present invention, but the benefits obtained by the present invention will be optimized in a security system, such as the system 110, incorporating both of these blocks 116 and 118.

Using the API access block 116 and the API parameter limit block 118, the security system 110 is segmented into several security zones. These security zones define the security areas configurable by the program administrator, and the sum of all of the security zones defines the security range of functions and/or parameters controlled by the security system 110. These security zones may overlap. For example, access to a given function may be limited by a security zone implemented by the API access block 116, and parameters employed by that given function may also be limited by a security zone implemented in the API parameter limit block 118.

The first security zone of the exemplary security system 110 is the min/max security zone. The min/max security zone, which is implemented as part of the API parameter limit block 118, allows the program administrator to set minimum and maximum acceleration, deceleration, and velocity parameter value limits for given functions defined by the API. If set properly, these limits will prevent the motion control system designer from writing application programs that could potentially damage the motion control device or devices that form part of the motion control system 10.

The second exemplary security zone is the Hardware Limit Enable security zone. This security zone is implemented as part of the API access block 116 and allows (or disallows) the programmer to enable or disable the hardware limits. When disabled, hardware limits designed to prevent damage to the motion control device are removed.

The third exemplary security zone is the Software Limit Enable security zone. This security zone is implemented as part of the API access block 116 and allows (or disallows) programmers to enable or disable the software limits. When enabled, all application programs are bound by the initial limit positions of the current device driver. The initial limits of the current device driver may be changed programmatically or visually through an Advanced Properties screen allowing access to the current device driver data. Generally speaking, but not necessarily, the performance envelope defined by the software limits of the Software Limit Enable security zone will be within the performance envelope defined by the hardware limits of the Hardware Limit Enable security zone.

The fourth exemplary security zone is the Single Control security zone. This security zone is implemented as part of the API access block 116. The system 10 can run more than one application program 26 at a given time. When enabled, the Single Control security zone allows only the first application program 26 that connects to the motion control component 35 to control the motion control device(s) 20. The types of functions that may be called by any subsequent application program 26 that connects to the motion control component 35 will be restricted as defined in the Single Control security zone. For example, the first application program 26 that connects to the motion control component 35 will be allowed to control movement a given motion control device (e.g., MOVE command), while the second application program that connects to the motion control component 35 will be restricted to functions that monitor the status of the given motion control device (e.g., GETPOSITION command).

The fifth exemplary security zone is the Hardware Initialize security zone. This security zone is also implemented as part of the API access block 116. The Hardware Initialize security zone requires any application program that connects to the motion control component 35 to call an initializing function such as INITIALIZEHARDWARE. Any application program that does not call the initializing function will be prevented from accessing any functions defined by the API.

As mentioned above, these security zones may overlap with each other. In addition, not all of these security zones need be employed in a given implementation of the security system 110. The program administrator may determine that some or all of the restrictions represented by the security zones described above are unnecessary and/or determine that other restrictions are in order.

In the exemplary system 110, access to all functions called by an application program is limited by the Hardware Initialize security zone. If more than one application program is connected to the motion control component 35, access to certain functions will likely further be limited by the Single Control security zone. If a given application meets the requirements of the Hardware Initialize and Single Control security zones, the Hardware Limit and Software Limit security zones will limit access by the application program to controlled functions. And if the given application program attempts to change a controlled parameter of a given function, that application must further meet any requirements of the Min/Max security zone.

Referring now to FIG. 3, shown therein is a module interaction map illustrating the interaction of the various modules of the exemplary system 10 that are used to implement the security system 110.

Initially, it should be noted that the exemplary security system 110 is implemented using a security portion 120 of an operating system 122 on which the software program 22 is designed to run. Most modern operating systems are designed with internal security for limiting user access to certain functions. The exemplary security system 110 is designed to make use of the security portion 120, but a separate piece of software external to the operating system 122 may be written specifically to limit user access in an equivalent manner.

As is conventional, the operating system 122 contains a registry database 124 that is accessible to the components that implement the security system 110.

The first step of using the security system 110 is for the user to logon to the system by communicating with the driver administrator CPL applet to input a username and a password. The user may be an individual or may be an account recognized by the security system 110, which may be used by a number individuals. The term "user" as employed herein thus is interchangeable with the term "account" as conventionally used in computer software.

The security system 110 compares the username and password with an internal database, set or list to determine the user's level of access. If the user is not a program administrator, the user has access to the motion control component 35 but is subject to all access and parameter limitations. This situation will be described below with reference to steps five through six of the process depicted in FIG. 1.

If the user is a program administrator, the user can alter the security system 110 and/or override any access or parameter limitations as shown by the second step in FIG. 3. More specifically, the Driver Administrator CPL applet 38 displays a Settings panel 126 and/or an Advanced Properties panel 128 that allows the user visually to alter the settings of security system 110 through the Driver Administrator CPL applet 38. The user so logged on may change these settings programmatically as well.

As shown in the third step in FIG. 3, upon closing the Driver Administrator CPL applet 38, all security settings are passed to the Driver Administrator Component 32. The Driver Administrator Component 32 stores the security settings in a persistent file 130, as shown in the fourth step shown in FIG. 3.

Subsequently, the security settings stored in the file 130 are used by the motion control component 35. In particular, as shown in the fifth step, when the component 35 is created, it queries the Driver Administrator Component 32 for the security settings. The motion control component 35 later uses the settings to limit API access and/or to limit access to or clip parameters that are out of the pre-designated ranges defined by the security settings.

In the sixth step of the process depicted in FIG. 3, the motion control component 35 organizes the security settings into an API security mask 132 that implements the security zones discussed above.

Once the API security mask 132 is established, the software system 22 prevents non-authorized users from changing the security settings using the Settings panel 126 and/or the Advanced Properties panel 128. The system 22 will also limit such a non-authorized user's ability to use the motion control component 35 according to the limitations embodied in the API security mask 132.

An API function call can be secured in a number of ways. First, upon receiving a function call, the internal API code can be configured to use the operating system's underlying security settings to verify whether or not the call should be allowed.

Figure 4:
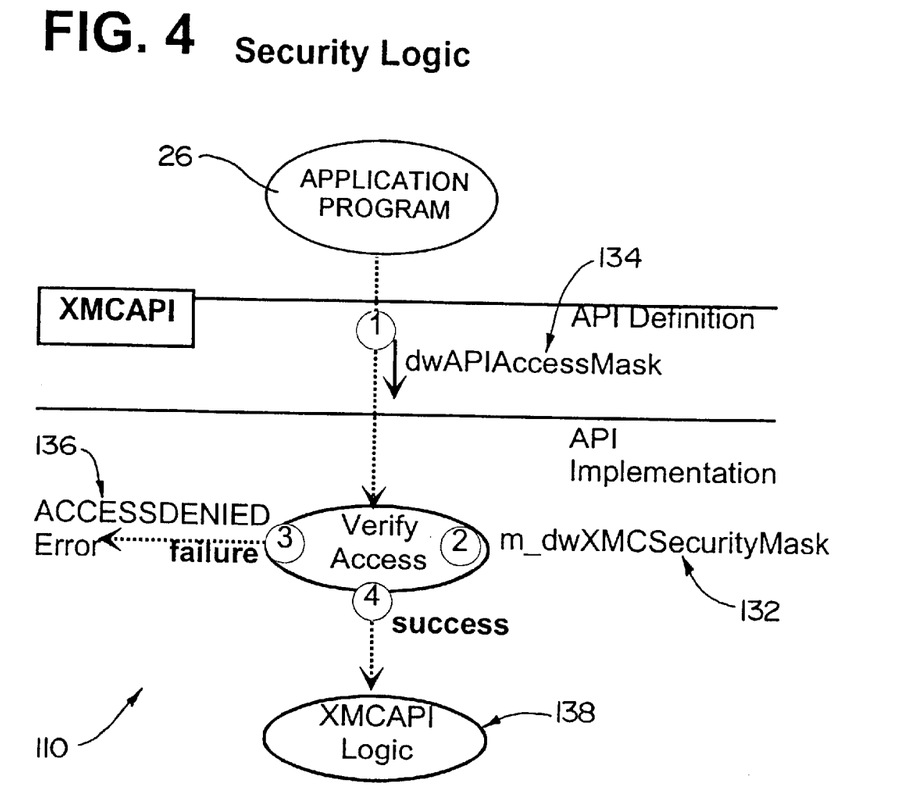
FIG. 4 is a logic flow diagram illustrated exemplary logic employed by the security system of the present invention.

Another method of implementing secure API function calls is depicted in FIG. 4. The method depicted in FIG. 4 verifies secure access to the API call by comparing the access required by the API function call with the current security settings allowed. In particular, in the first step of FIG. 4, the application program 26 connected to the motion control component 35 calls one of the API functions, which within its definition contains the access rights necessary to run the logic making up the function.

In the second step of FIG. 4, the security system 110 compares a function mask 134 defining the access rights required by the API to the security mask 132 defining the system access rights previously set either programmatically or via a visual user-interface. The two masks are logically ANDed together. If the result of the mask AND operation does not exactly equal the access rights required by the API (step 3 in FIG. 4), the function call fails and the security system 110 generates an appropriate error 136 such as ACCESSDENIED. If, on the other hand, the result of the mask AND operation does equal the access rights required by the API, the function continues running the body of logic 138 that defines the called function (step 4 in FIG. 4).

An alternative to the mask AND operation would be to use a username/password check on each API call to verify that the user has proper access. In this case, each API function is associated with a security level. Each user and/or account would also be associated with a security level, and the system 110 simply checks the security level of each called function against the security level of the user or account to determine whether to allow access to the function.

From the foregoing, it should be clear that the present invention may be embodied in forms other than those described above. In particular, while the exemplary security system 110 is optimized for use with the exemplary motion control system 10 described herein, one of ordinary skill in the art will understand that the principles of the present invention may be applied more generally to other systems for generating command code and more specifically to other systems for generating control commands for controlling motion control devices.

The scope of the present invention should thus be determined by the claims ultimately allowed and not the foregoing detailed discussion of the preferred embodiments.

What is claimed is:

1. A method of generating control commands to be executed by a motion control system to move an object in a desired manner, the method comprising the steps of:
   determining a plurality of functions that may be executed by the motion control system;
   creating a set of accounts associated with application programs comprising at least one of the functions;
   providing a motion system for generating the control commands based on the application programs;
   determining a plurality of access levels;
   associating each of the plurality of functions with one of the access levels;

associating each of the accounts in the set of accounts with one of the access levels;

determining from the set of accounts the access level of a given account;

comparing the access level of the particular account with the access level of each function used by the given account; and controlling the control command generating system to restrict the generation of control commands if the access level of at least one of the functions of a given application program created by the given account is not consistent with the access level of the given account.

2. A method as recited in claim 1, in which the step of controlling the control command generating system comprises the step of identifying at least one of the functions as a restricted function access to which is to be limited.

3. A method as recited in claim 2, in which the at least one restricted function is the ability to disable hardware limitations.

4. A method as recited in claim 2, in which the at least one restricted function is the ability to disable software limitations.

5. A method as recited in claim 1, further comprising the steps of:

determining limits for at least one restricted parameter associated with the at least one of the restricted functions; and controlling the control command generating system to restrict the generation of control commands based on whether the given application program contains a restricted function having a restricted parameter that is not within the limits of the restricted parameter.

6. A method as recited in claim 5, in which the step of controlling the control command generating system comprises the step of preventing the generation of control commands if the given application program contains a restricted function having a restricted parameter that is not within the limits of the restricted parameter.

7. A method as recited in claim 5, in which the step of controlling the control command generating system comprises the step of limiting the generation of control commands based on the limits of the restricted parameter if the given application program contains a restricted function having a restricted parameter that is not within the limits of the restricted parameter.

8. A method as recited in claim 5, in which the step of controlling the control command generating system comprises the step of limiting the generation of control commands to the limits of the restricted parameter if the given application program contains a restricted function having a restricted parameter that is not within the limits of the restricted parameter.

9. A method as recited in claim 5, in which the at least one restricted parameter is at least one parameter selected from the group of parameters including minimum velocity, maximum velocity, minimum acceleration, maximum acceleration, minimum deceleration, maximum deceleration, minimum velocity, and maximum velocity.

10. A method as recited in claim 1 in which the step of controlling the control command generating system comprises the step of preventing the generation of control commands if the access level of at least one of the functions of the given application program created by the given user is not consistent with the access level of the given user.

11. A method as recited in claim 10, in which the step of preventing the generation of control commands comprises the step of preventing the generation of control commands for the at least one of the functions of the given application program the access level of which is higher than the access level of the user.

12. A method as recited in claim 10, further comprising the steps of:

determining limits for at least one restricted parameter associated with the at least one of the restricted functions; and controlling the control command generating system to restrict the generation of control commands based on whether the given application program contains a restricted function having a restricted parameter that is not within the limits of the restricted parameter.

13. A method as recited in claim 12, in which the step of controlling the control command generating system comprises the step of preventing the generation of control commands when the given application program contains a restricted function having a restricted parameter that is not within the limits of the restricted parameter.

14. A method as recited in claim 12, in which the at least one restricted parameter is at least one parameter selected from the group of parameters including minimum velocity, maximum velocity, minimum acceleration, maximum acceleration, minimum deceleration, maximum deceleration, minimum velocity, and maximum velocity.

15. A method as recited in claim 12, in which the step of controlling the control command generating system comprises the step of limiting the generation of control commands based on the limits of the restricted parameter when the given application program contains a restricted function having a restricted parameter that is not within the limits of the restricted parameter.

16. A method as recited in claim 12, in which the step of controlling the control command generating system comprises the step of limiting the generation of control commands to the limits of the restricted parameter when the given application program contains a restricted function having a restricted parameter that is not within the limits of the restricted parameter.

17. A method as recited in claim 1, in which the step of providing a control command generating system further comprises the step of providing means for generating control commands for a plurality of application programs simultaneously for real time execution, the method further comprising the steps of:

determining which of the plurality of application programs is a first given application program, and restricting the generation of control commands for the functions of a second given application program based on the execution of the first given application program.

18. A method as recited in claim 17, in which the step of determining which of the plurality of application programs is a first given application program comprise the step of determining which of the plurality of application programs was the first to begin execution.

19. A method as recited in claim 1, further comprising the steps of:

determining whether the application program has called an initializing function; and restricting the generation of control commands for the functions of a second given application program if the application has not called the initializing function.

20. A method of generating control commands to be executed by a motion control system to move an object in a desired manner, the method comprising the steps of:

determining a plurality of functions that may be executed by the motion control system;

determining which of the plurality of functions are restricted functions access to which is to be limited;

creating a set of accounts who create application programs comprising at least one of the functions;

providing a control command generating system for generating the control commands based on the application programs;

determining a plurality of access levels;

associating each of the plurality of functions with one of the access levels;

associating each of the accounts in the set of accounts with one of the access levels;

determining from the set of accounts the access level of a given account;

determining whether the access level of the particular account is less than the access level of any restricted functions included in a given application program created by the given account; and controlling the control command generating system to restrict the generation of control commands for any restricted functions included in the given application program if the access level of the given account is less than the access level of any restricted function included in the given application program.

21. A method as recited in claim 20, in which the restricted functions comprise:

controlled functions, where the step of controlling the control command generating system comprises the step of preventing access to controlled functions by the given application program; and parameter-control functions, where parameter-control functions are functions having at least one controlled parameter having predetermined limits, and the step of controlling the control command generating system comprises the step of restricting access to parameter-control functions if the controlled parameter of the given application program is not within the predetermined limits.

22. A method of operating a motion control system to move an object in a desired manner, the method comprising the steps of:

defining a plurality of functions that may be called to cause the motion control system to move the object;

defining a plurality of security levels;

providing an application program that calls at least one of the functions; and restricting the ability of the application program to call at least one of the functions based on the security levels.

23. A method as recited in claim 22, in which the step of restricting the ability of the application program to call at least one of the functions further comprises the steps of:

modifying security settings of an underlying operating system based on the plurality of security levels; and comparing each function called by the application program with the security settings of the underlying operating system.

24. A method as recited in claim 22, in which the step of restricting the ability of the application program to call at least one of the functions further comprises the steps of:

creating a function mask for each function, where the function masks define the security level of the function associated therewith;

creating a system security mask based on the security levels; and comparing the function mask of each function called by the application program with the system security mask.

25. A method as recited in claim 22, in which the step of restricting the ability of the application program to call at least one of the functions further comprises the steps of:

creating a set of accounts, where each account is associated with one of the security levels;

associating the application program with at least one of the accounts; and restricting the ability of the application program to call at least one of the functions further based on the security level of the at least one account associated with the application program.

* * * * *